(12) United States Patent
Tagamolila et al.

(10) Patent No.: US 6,883,788 B1
(45) Date of Patent: Apr. 26, 2005

(54) SHIELDING OF HEAT EXCHANGERS IN COLUMNS

(75) Inventors: Constante P. Tagamolila, Arlington Heights, IL (US); F. Joseph O'Driscoll, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 10/189,866

(22) Filed: Jul. 3, 2002

(51) Int. Cl.[7] ................................................ B01F 3/04
(52) U.S. Cl. ....................... 261/128; 261/152; 261/155; 165/DIG. 197
(58) Field of Search ................................. 261/127, 128, 261/152, 155, 156, DIG. 10, DIG. 32; 165/913, DIG. 186, DIG. 193, DIG. 197

(56) References Cited

U.S. PATENT DOCUMENTS

| | | | |
|---|---|---|---|
| 2,044,372 A | | 6/1936 | Twomey ..................... 257/226 |
| 2,093,895 A | * | 9/1937 | Mojonnier et al. ........... 159/22 |
| 3,927,153 A | * | 12/1975 | Tarhan ........................ 261/128 |
| 4,218,289 A | | 8/1980 | Hajek et al. ................. 202/161 |
| 4,522,257 A | * | 6/1985 | Wolfseder ................... 165/113 |
| 4,732,210 A | * | 3/1988 | Michalak et al. ...... 165/104.18 |
| 5,437,714 A | * | 8/1995 | Cook et al. .................... 96/201 |
| 5,507,356 A | | 4/1996 | Roth et al. ................... 165/111 |
| 2003/0015809 A1 | * | 1/2003 | Carson ........................ 261/115 |

FOREIGN PATENT DOCUMENTS

DE  198 30 163 A1  1/2000

OTHER PUBLICATIONS

Kirschbaum, E., *Distillation and Rectification*, Chemical Publishing Co., Inc. New York, 1948, pp. 80–85 and 310–311.

* cited by examiner

*Primary Examiner*—Scott Bushey
(74) *Attorney, Agent, or Firm*—John G. Tolomei; James C. Paschall; David J. Piasecki

(57) ABSTRACT

Disclosed is a method and an apparatus for exchanging heat in a column by passing a first vapor phase through a heat exchanger in the column to exchange heat with a first stream and produce a second vapor phase in the column. The second vapor phase is passed through a shielding device located above the heat exchanger and the shielding device prevents descending liquid from contacting the heat exchanger. The shielding device may be interposed between two heat exchangers in the column.

20 Claims, 6 Drawing Sheets

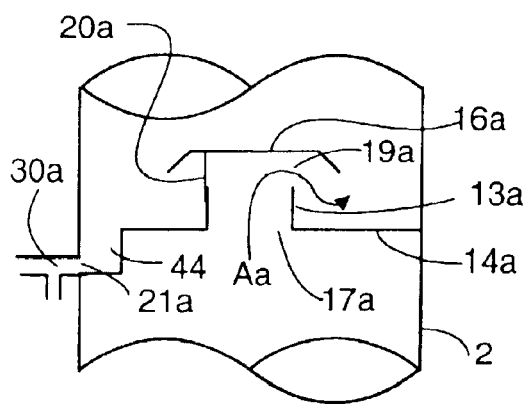
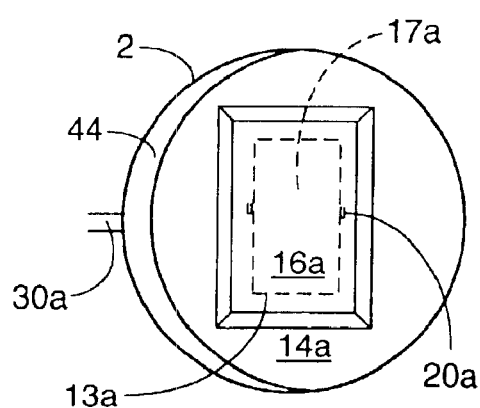
FIG. 6A          FIG. 6B
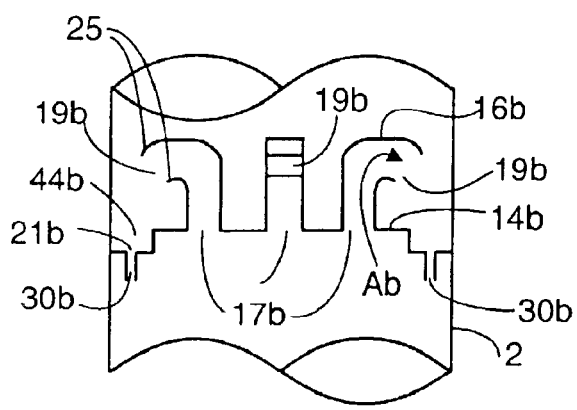
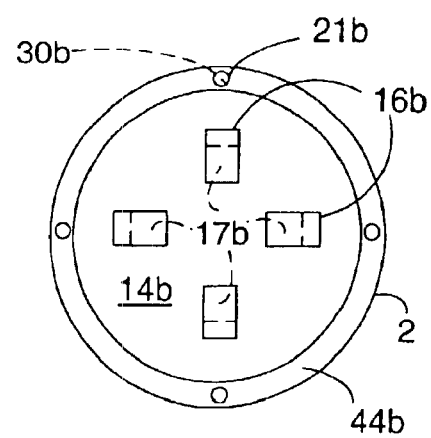
FIG. 7A          FIG. 7B
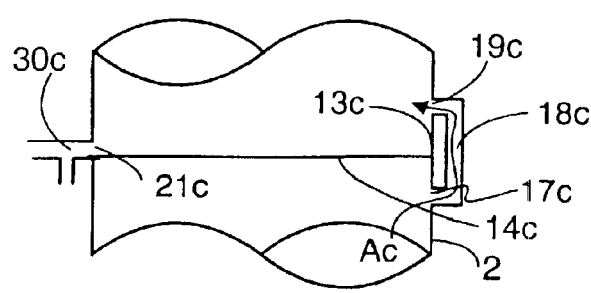
FIG. 8

SHIELDING OF HEAT EXCHANGERS IN COLUMNS

BACKGROUND OF THE INVENTION

1. Field of the Invention

The invention relates to a process and apparatus for transferring heat in columns. The invention more specifically relates to shielding heat exchangers in columns from liquid.

2. Description of Related Art

Many industries such as petrochemical, chemical and petroleum refining use columns for separating mixtures. Such columns are typically cylindrical, vertically orientated vessels wherein rising vapor and descending liquid come into contact, transfer components, separate, and pass respectively towards the top and bottom sections of the column. Frequently, columns contain vapor-liquid contacting devices to enhance the contacting and separation of the vapor and liquid phases. Examples of vapor-liquid contacting devices include trays and packings. Many of these vapor/liquid contacting devices have a wide variety of designs. For example, tray types of vapor/liquid contacting devices include bubble cap, sieve, valve, and multiple downcomer trays which typically allow liquid to descend and vapor to ascend through the tray. Packings include random packings, filled with Raschig rings or Berl saddles for example and structured packings. The specific operating conditions of individual columns may vary significantly in order to accomplish the myriad separations for the vastly different mixtures that are processed. Examples of processes that use such columns include stripping, rectification, and various forms of distillation such as fractional distillation, steam distillation, reactive distillation and distillation in divided wall columns. These processes may be operated in either batch or continuous modes. Reducing the installed and operating costs of the column are common objectives of the design and operation. In many cases, this effort focuses on the equipment and utilities required for the supply and removal of heat from the column.

Commonly, heat is supplied or removed from the column by removing a stream from the column, passing it through a heat exchanger external to the column shell, and returning at least part of the stream thus cooled or heated to the column. For example, overhead vapor may be withdrawn from the top section of the column and passed to an overhead system outside the column shell that comprises a heat exchanger which condenses liquid from the overhead vapor and a means for returning at least a portion of the condensed liquid to the column to provide reflux. The overhead system frequently also comprises a receiver to separate the condensed liquid from uncondensed vapor, a pump to transfer the liquid from the receiver to the column, pipes, and valves. Such heat exchangers are commonly referred to as condensers or partial condensers. In an analogous manner, heat exchangers are commonly used to provide vapor to the column by heating a liquid stream removed from the bottom section of the column. Vapor and liquid streams may be withdrawn from the central section between the top and bottom sections of the column, heated or cooled and returned to the column.

Multiple heat exchangers are used to exchange heat in a step-wise manner. For example, heat is recovered from a vapor phase in a first heat exchanger for use elsewhere, such as to generate steam followed by a second heat exchanger to further cool the remaining vapor phase to meet a temperature requirement, such as for storage. Additional examples are illustrated and discussed in E. Kirschbaum, *Distillation and Rectification,* 82–85 (Chemical Publishing Co. 1948). This text shows a first heat exchanger located inside the top section of a shell and a second heat exchanger located external to the shell of a still in FIG. 49 on page 80 and of a packed column in FIG. 197 on page 310.

U.S. Pat. Nos. 2,044,372; 4,218,289; and 5,507,356; and DE 198 30 163 A1 all describe the use of various heat exchangers inside columns to at least partially condense vapor in the top section of columns.

U.S. Pat. No. 2,044,372 also describes the use of a vertical submerged condenser between a low pressure section and a high pressure section of a single column.

U.S. Pat. No. 5,507,356 also describes the use of a plate heat exchanger operated as a condenser installed between two packed beds or trays within the column situated within a collecting vessel open at the top.

Various benefits can be obtained by using heat exchangers inside columns compared to locating them outside the column shell. For example, some equipment of the overhead system and associated supporting structure can be eliminated when the condenser is located inside the column. This provides savings in terms of both cost and space. Also, the pressure drop through such an internal heat exchanger can be lower than that of the equivalent external overhead system. The lower pressure drop is an especially important factor when the column is operated at subatmospheric pressure such as when the mixture being processed in the column is heat sensitive.

In many applications using two heat exchangers to cool the vapors in the column, much of the benefit obtained in locating the first exchanger in the column, such as lower pressure drop and reduced costs, is lost by locating the second heat exchanger outside of the column.

BRIEF SUMMARY OF THE INVENTION

One problem in locating two heat exchangers in a column to cool the vapors therein is that liquid formed in the uppermost heat exchanger contacts the lower heat exchanger and affects its operation. Descending liquid could, for example, change the heat transfer intended thus causing, for example, insufficient recovery of heat for use elsewhere. Additionally, descending liquid could flood and dam some or all of the vapor flow paths within the heat exchanger causing increased pressure drop and/or unstable operations. The subject invention provides a novel, cost effective solution for the foregoing problems. The subject invention may also be used to shield heat exchangers inside columns that exchange heat with a vapor phase wherever there is descending liquid, such as between two vapor/liquid contacting devices.

One embodiment of the subject invention may be described as a method of exchanging heat in a column by passing a first vapor phase in the column through a heat exchanger in the column to exchange heat with a first stream and produce a second vapor phase in the column. The second vapor phase is passed through a shielding device located above the heat exchanger. The shielding device prevents descending liquid from contacting the heat exchanger.

A second embodiment of the subject invention may be described as a method of exchanging heat in a column by passing a first vapor phase in the column through a heat exchanger in the column to exchange heat with a first stream and produce a second vapor phase in the column. The second vapor phase is passed through a shielding device located above the heat exchanger and the shielding device prevents descending liquid from contacting the heat exchanger. At least a portion of the second vapor phase above the shielding device passes through a second heat exchanger inside the column to exchange heat with a second stream.

A third embodiment of the subject invention may be described as an apparatus for exchanging heat in a column comprising a heat exchanger located inside the column. The heat exchanger is in fluid communication with a vapor phase in the column and a first stream. A shielding device is located above the heat exchanger and has a liquid outlet and a vapor passage. The vapor passage has a vapor inlet in fluid communication with the column below the shielding device and a vapor outlet in fluid communication with the column above the shielding device. The shielding device comprising a barrier, and the apparatus is arranged to shield the heat exchanger from contact with descending liquid

BRIEF DESCRIPTION OF THE DRAWINGS

FIGS. 6A and 6B respectively illustrate a sectional side view and overhead view of an embodiment of the invention.

FIGS. 7A and 7B respectively illustrate a sectional side view and overhead view of an embodiment of the invention.

FIG. 8 illustrates a sectional side view of an embodiment of the invention.

DETAILED DESCRIPTION

A column according to the subject invention can be designed as desired and be matched to any applications for which columns are conventionally used, such as for reactions, but typically for separating mixtures such as in various types of distillation columns.

A detailed description and various embodiments of the subject invention will now be given by reference to the accompanying drawings. The drawings are simplified schematic views, not to scale, only showing the components of the column necessary for an understanding of the invention. The drawings are presented to illustrate some embodiments of the invention and are not intended to limit the scope of the invention as set forth in the claims.

Figure 1:
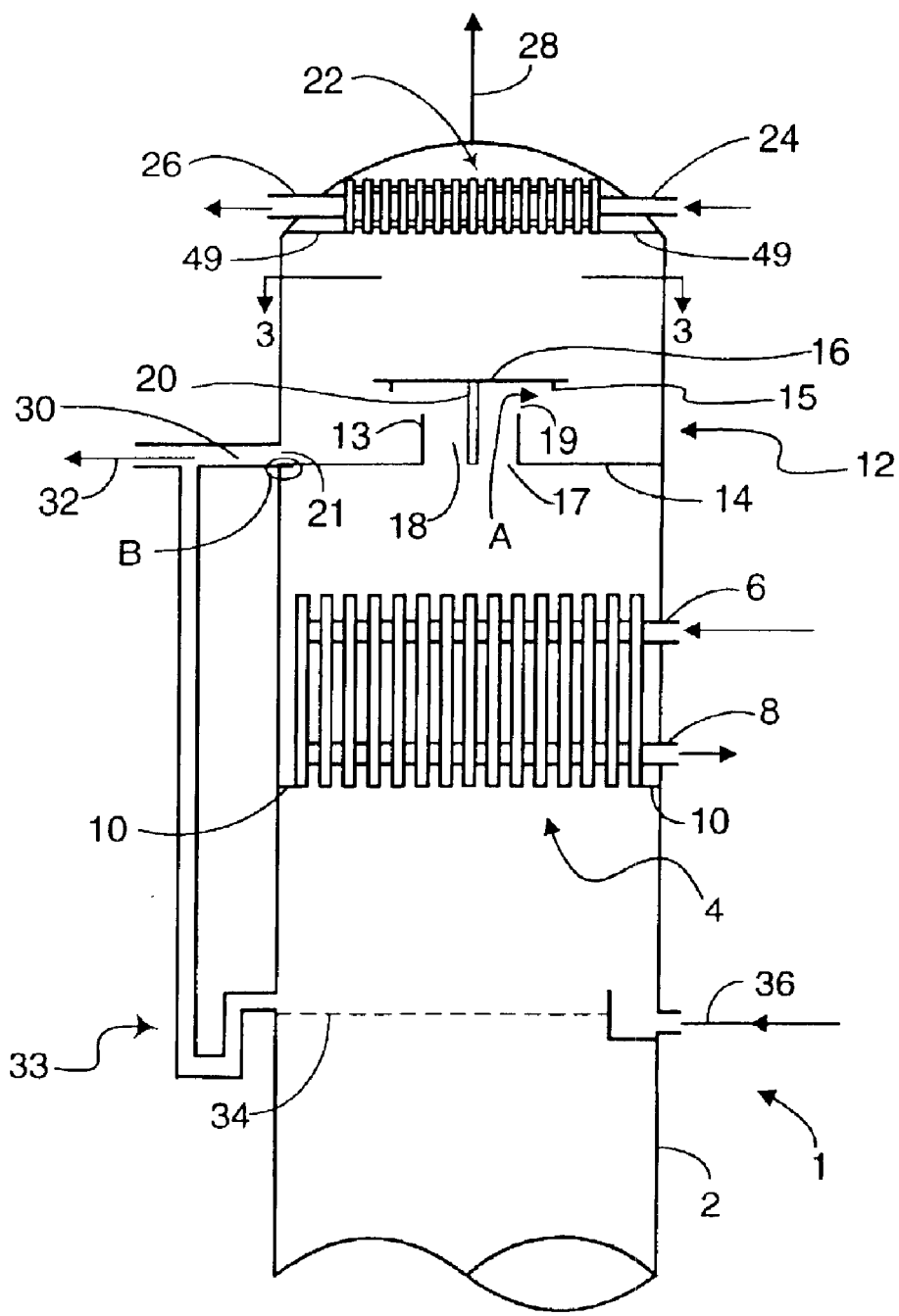
FIG. 1 is a sectional side view of a column depicting an embodiment of the invention.

Referring now to FIG. 1, there is shown a top section of a column 1 having a shell 2. A first vapor phase ascends from an uppermost vapor/liquid contacting device 34 and passes through a first heat exchanger 4. The specific form and details of vapor/liquid contacting devices in the column are non-essential for the purposes of the subject invention. Thus, they may be any type of tray, packing, or other device wherein ascending vapor and descending liquid are contacted and separated, such as a reaction zone. In an embodiment not shown, the first vapor phase passes through other elements such as a bed of adsorbent or catalyst located between the uppermost vapor/liquid contacting device 34 and the first heat exchanger 4. In columns with no vapor/liquid contacting devices, the highest level at which liquid is introduced to or forms within the column is equivalent to the level of the uppermost vapor/liquid contacting device 34. An optional baffle 10 extends from the shell 2 to direct substantially all of the first vapor phase through the first heat exchanger 4. The baffle may be made of any suitable material considering the operating conditions of the column and may be similar to the material of the shell 2. The baffle 10 may be constructed from one or more pieces and be secured to the shell 2 and each other by any conventional means such as welding, seal welding, bolting and gasketing. In other embodiments not shown, the baffle 10 is not required or it may be arranged to allow a portion of the first vapor phase to by-pass the first heat exchanger 4 according to the specific operating requirements of the application.

A first stream passes through a first conduit 6 to an inlet of the first heat exchanger 4 and flows in a parallel fashion downwards inside the hollow plates counter-currently to the first vapor phase ascending through the spaces between the plates. The first stream exits the first heat exchanger 4 via an outlet and passes through a second conduit 8. A first condensate precipitates from the first vapor phase and falls from the first heat exchanger 4 to the uppermost vapor/liquid contacting device 34 to form at least a portion of the reflux to the column. In an embodiment not illustrated, the condensate formed in the heat exchanger 4 is collected, metered, and/or distributed across the vapor/liquid contacting device 34. In further embodiments not shown, the collected condensate is metered and/or distributed to other locations in the column and withdrawn from the column according to the specific requirements of the application.

The first heat exchanger 4 produces a second vapor phase, which passes through the shielding device 12 in a vapor passage 18 of the shielding device 12. In this embodiment, the shielding device 12 comprises two barriers 14 and 16 which are arranged to define the vapor passage 18. The barrier 14 may be a combination of a planar portion which may be roughly perpendicular to the axis of the column and a roughly vertical cylindrical wall or portion 13. The barrier 14 extends from the shell 2 and defines a circular opening comprising a vapor inlet 17. The barrier 16 may be approximately parallel to the planar portion of the barrier 14 and is shown with an optional drip edge 15 to prevent liquid from running over the edge of the barrier 16 and along its bottom side to fall onto the first heat exchanger through the vapor passage 18. The drip edge may be considered part of the barrier 16 and may be of any suitable shape and design well known to those of ordinary skill in the art to cause the liquid to fall onto the planar portion of the barrier 14. The vapor passage 18 may comprise the vapor inlet 17 providing fluid communication with the column below the shielding device 12 the cylindrical wall or portion 13, and a vapor outlet 19. The vapor outlet 19 of an imaginary cylindrical shape is defined between the barrier 16 and an upper edge of the cylindrical wall or portion 13 above the barrier 14. The vapor outlet 19 provides fluid communication with the column above the shielding device 12. Hence, the vapor may pass through the shielding device 12 by the path as shown by arrow "A". To more clearly show the vapor path, the top and bottom edges of the cylindrical wall or portion 13 that would be seen in this view have been removed. The barrier 16 is spaced apart from the barrier 14 and held in place by supports 20, one of four is shown in this view. In this embodiment, the vapor inlet 17 is located inside an imaginary vertical cylinder corresponding to and extending vertically from a side of the cylindrical wall 13 closest to the vapor passage 18 and the vapor outlet 19 is located outside the imaginary vertical cylinder. Thus, it is shown that no more than one of the group consisting of the vapor inlet, the vapor outlet, and the heat exchanger are vertically aligned to prevent liquid from contacting the heat exchanger 4. In one embodiment, the cylindrical area of the vapor outlet 19 is at least about 1.5 times greater than the circular area of the vapor inlet 17.

The number and design of the vapor passages 18 must be determined to balance the objectives of the specific application such as minimizing the pressure drop through the shielding device 12 while maintaining the required vapor distribution above it. Similarly, the number and arrangement of the barriers must be determined based on the specific application and ease of fabrication and installation. A barrier may be formed from any suitable material considering the operating conditions of the column. The material may be similar to the material of the shell 2. They may be of any suitable thickness subject to mechanical requirements of their structure and any attachments required. They may be formed from a single piece or they may consist of multiple pieces that are affixed together. Trays may also be used as barriers or partial barriers, insofar as they allow the passage of vapor through the shielding device and the vapor is contacted with a liquid. However, the tray would have to be modified or arranged in conjunction with another barrier to prevent liquid from contacting the heat exchanger 4. In such an embodiment incorporating a tray, the shielding device provides another stage of vapor/liquid contacting and heat and mass are transferred between the vapor and liquid phases within the same section of the column. When pieces are affixed together or to the shell 2 they shall be sealed, so that substantially no liquid descends through the shielding device and onto the first heat exchanger 4. Examples of such sealing include seal welding or the use of gaskets and bolting. A variety of supports such as bars, tabs, or cables may be used to arrange multiple barriers relative to each other as required. These may be affixed to the barriers, the shell or other elements inside the column as required, such as by welding, seal welding, bolting, and gasketing.

Above the shielding device 12, the second vapor phase passes through a second heat exchanger 22 wherein a second condensate is precipitated from the second vapor phase. A second optional baffle 49, analogous to the baffle 10, extends from the shell 2 to direct substantially all of the second vapor phase through the second heat exchanger 22. A second stream passes through a third conduit 24 to an inlet of the second heat exchanger 22 and flows inside the hollow plates in series across the second heat exchanger transverse to the direction of the vapor ascending between the plates and exits the second heat exchanger 22 via an outlet and passes through a fourth conduit 26. Any remaining uncondensed vapor from the second heat exchanger exits the column as an overhead vapor product 28.

Figure 2:
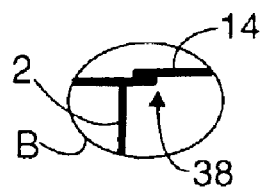
FIG. 2 is an enlarged view of the area "B" encircled in FIG. 1

The second condensate falls from the second heat exchanger and is intercepted by the barriers 14 and 16 of the shielding device 12. A liquid outlet 21 of the shielding device 12 is located in the shell 2 and provides communication with a liquid conduit 30 for the removal of liquid from the shielding device 12. As shown in enlarged view of portion "B" in FIG. 2, a lowermost section of the barrier 14 is disposed above a lowermost section of the liquid conduit 30 at overlap 38 to freely drain liquid from the shielding device 12. In an embodiment not shown the shielding device may include a small drip hole to assure drainage for example during shut down. However, any leakage through the drip hole will not substantially affect the operation of the heat exchanger 4. Preferably, the drip hole will not be vertically aligned with the heat exchanger 4 to prevent leakage from contacting the heat exchanger 4. Valves, not shown, may be included in the liquid conduit 30 so that the intercepted liquid may be directed to other locations in the column such as to the uppermost vapor/liquid contacting device 34 as shown, or removed from the column as a liquid product 32, or split between these destinations as desired. A liquid seal leg 33 comprising a "J" section of the pipe prevents vapor from flowing up the liquid conduit. Other means to accomplish this such as liquid traps are well known to those of ordinary skill in the art. Optionally, a liquid product 36 may be withdrawn from the column from the uppermost vapor/liquid contacting device 34. Details regarding removing liquid from the column such as the flow rate, control method, and location will be determined by the specific application and are non-essential to the subject invention. The liquid products removed from the column may be routed and/or combined as required.

In the embodiment shown, both heat exchangers 4 and 22 are condensers and/or partial condensers of a plate type through which the vapor phase ascends past the plates which are oriented substantially vertically. The use of plate heat exchangers which typically provide a higher heat transfer coefficient and greater surface area per unit volume than other types of exchangers typically facilitates their incorporation into the column. Plate heat exchangers can also be designed for applications requiring a low pressure drop such as subatmospheric columns. A relatively direct ascending route for the vapor phase over the exposed surfaces of the exchanger plates also provides for a lower pressure drop across the heat exchanger.

The specific design details of both heat exchangers are non-essential to the subject invention and may vary significantly to meet the requirements of the specific application without affecting the subject invention. A few additional non-limiting examples include: various exchanger geometry such as tubular or shell and tube; having the vapor phase descend or pass horizontally through the heat exchanger; co-current, counter-current, or cross-flow arrangements. Likewise, the function of the heat exchangers may vary to meet the requirements of the specific application. For example, the first heat exchanger 4 may be designed to heat the first vapor phase, but more typically, it will be a condenser or a partial condenser to generate the reflux required, or it may be designed to reduce overall utilities such as by generating steam in the first stream for use elsewhere or for providing heat integration with a process stream. The second heat exchanger 22 may be designed for example to increase product recovery or to meet various product specifications of the overhead vapor product such as a temperature required for storage, or a purity specification.

Figure 3:
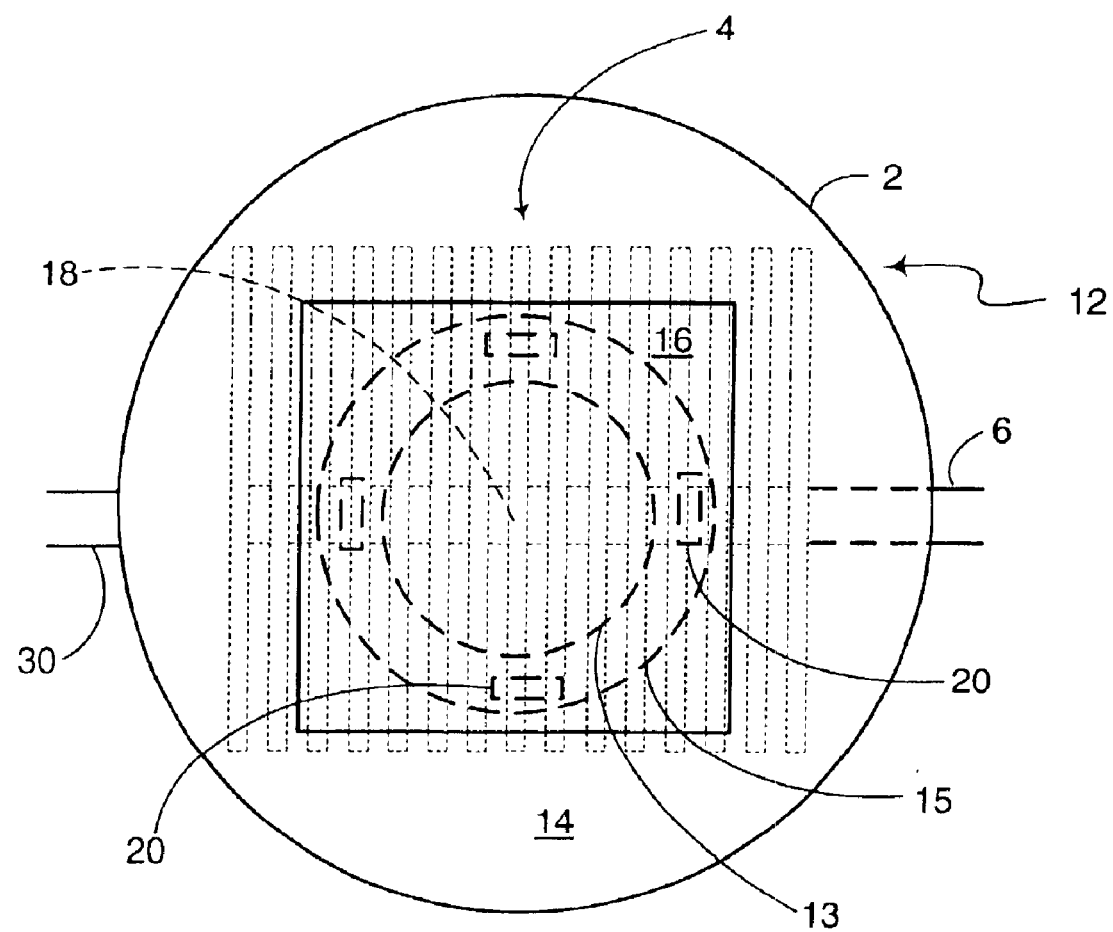
FIG. 3 is an overhead sectional view taken along the segment 3—3 marked in FIG. 1.

FIG. 3 is an overhead view taken along the segment 3—3 of FIG. 1 showing the arrangement of the shielding device 12 above the first heat exchanger 4. In this view, the first heat exchanger 4 is shown in outline below the barriers 14 and 16. This view shows how the barriers may overlap to shield vertical passage to the heat exchanger 4 by intercepting the descending liquid in the column and directing it to the liquid conduit 30 through the liquid outlet which is hidden from view by the shell 2. The barrier 16 is spaced apart from the top edge of the vertical cylindrical portion 13 of the barrier 14 and held in place by supports 20 which extend from the planar portion of the barrier 14 to the bottom side of barrier 16. The optional drip edge is shown as 15. In other embodiments not shown, the barrier 16 is supported and held in place by supports which extend from the top side and/or the edges of the barrier 16 to the shell 2 and/or components inside the column. In a further embodiment not shown, the barrier 16 may comprise several, roughly parallel, spaced apart "V" channels which overlap to substantially cover vapor passage 18 thus intercepting descending liquid and directing it laterally towards the shell 2 to fall on the planar portion of the barrier 14 while providing a more direct ascending path for the vapor between the "V" channels. This arrangement may be suitable for low pressure drop applications.

Figure 4:
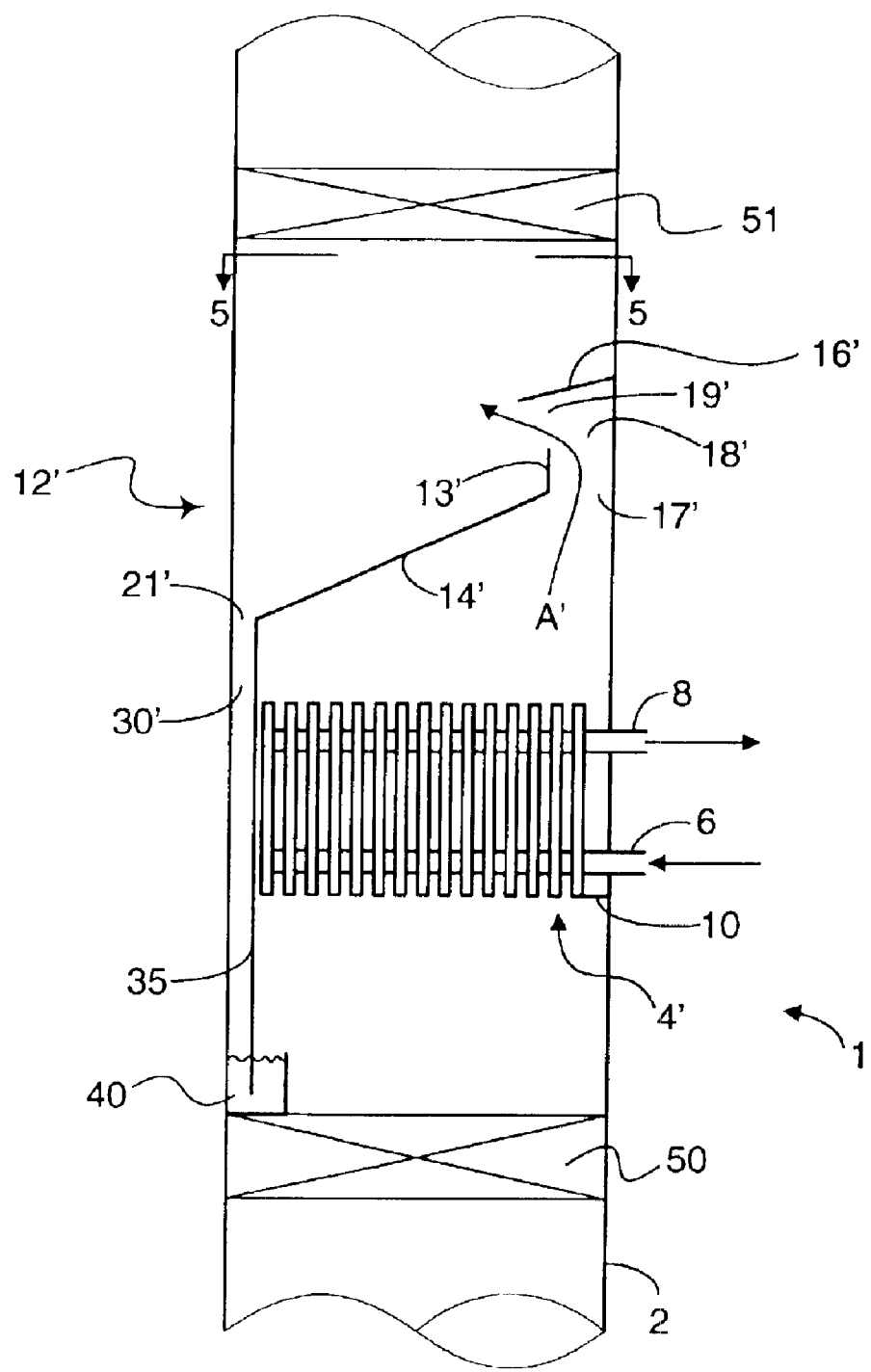
FIG. 4 is a sectional side view of a column depicting an embodiment of the invention.

Referring now to FIG. 4, there is shown an embodiment of the invention located between two vapor/liquid contacting devices in a column 1 having a shell 2. Elements in FIG. 4 that differ in configuration from their corresponding element in FIG. 1 will be designated by attaching a prime symbol "'" to the reference numeral. A first vapor phase ascends from a lower vapor/liquid contacting device 50 and passes through a heat exchanger 4'. As before, the specific form and details of the vapor/liquid contacting devices and the heat exchanger are non-essential to the subject invention and may vary significantly to meet the requirements of the specific application without affecting the subject invention.

A first stream passes through a first conduit 6 to an inlet of the first heat exchanger 4' and flows in a parallel fashion upwards inside the hollow plates co-currently to the first vapor phase ascending through the spaces between the plates and exits the first heat exchanger 4' via an outlet and passes through a second conduit 8 to heat or cool the first vapor phase as desired. If the heat exchanger 4' is a condenser or partial condenser used to precipitate condensate from the first vapor phase, the condensate falls to the lower vapor/liquid contacting device 50. In another embodiment not shown, at least a portion of the condensate is collected, metered, and/or distributed to other locations inside and/or outside the column as required.

The first heat exchanger 4' produces a second vapor phase, which passes through the shielding device 12' in a vapor passage 18' of the shielding device 12'. In another embodiment not shown, some of the vapor ascending from the lower vapor/liquid contacting device by-passes the heat exchanger 4' and likewise passes through the shielding device 12'. In the embodiment shown, the shielding device 12' comprises two inclined barriers 14' and 16' which are arranged with an inner surface of the shell 2 to define the vapor passage 18'. Barriers 14' and 16' may have a vertical component for drainage purposes but for shielding purposes should have a horizontal component. Barrier 14' includes an inclined planar portion and an optional vertical wall 13' that defines a chord with the inner surface of the shell 2. The vapor passage 18' has a vapor inlet 17' between a chordal upper edge of the inclined planar portion of the barrier 14' and the inner curved surface of the shell 2 providing fluid communication with the column below the shielding device 12'. A vapor outlet 19' of rectangular shape is defined between the barrier 16', the upper edge of the vertical wall 13' above the barrier 14', and the shell 2 to provide fluid communication with the column above the shielding device 12'. Hence, the vapor flow path through the shielding device may follow the arrow "A". In this embodiment, the vapor inlet 17' is located on one side of an imaginary vertical plane corresponding to and extending from a side of the wall 13' closest to the vapor passage 18' and the vapor outlet 19' is located on an opposite side of the imaginary vertical plane. Thus, it is shown that no more than one of the group consisting of the vapor inlet, the vapor outlet, and the heat exchanger are vertically aligned to prevent liquid from contacting the heat exchanger 4'. The barriers 14' and 16' are constructed and affixed to the shell as previously described. The barriers 14' and 16' are angled and overlapped as required to shield the heat exchanger from descending liquid. The optional vertical portion 13' prevents liquid from descending through the vapor passage 18' and contacting the heat exchanger.

Liquid descending from the upper vapor/liquid contacting device 51 is intercepted by the barriers 14' and 16' of the shielding device 12'. A top portion of a wall 35 is affixed to barrier 14' and to the inner surface of the shell 2 to define the liquid outlet 21' of the shielding device 12' which is just below the lowest edge of the barrier 14'. The wall 35 extends downwardly from the barrier 14' to define, with the shell 2, the liquid conduit 30'. Thus, liquid freely drains from the shielding device through the liquid outlet 21' to the liquid conduit 30'. The liquid conduit 30' directs the intercepted liquid to other locations in the column as required by the application such as to the lower vapor/liquid contacting device 50 as shown or via a liquid distributing device not shown. A liquid trap 40 provides the liquid seal to prevent vapor from flowing up the liquid conduit in this embodiment. In other embodiments not shown, the liquid outlet 21' and liquid conduit 30' may be divided and/or additional ones created to deliver the intercepted liquid to multiple destinations inside and/or outside the column as required by the specific application.

Figure 5:
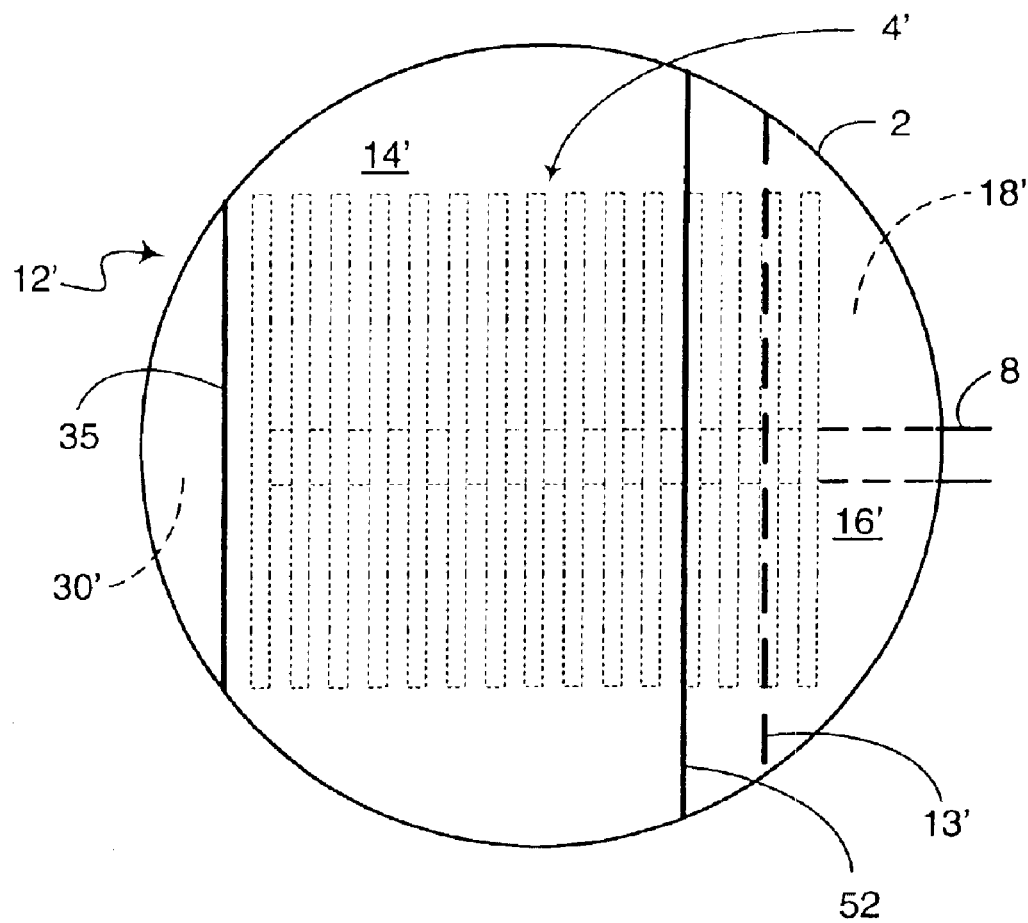
FIG. 5 is an overhead sectional view taken along the segment 5—5 marked in FIG. 4.

FIG. 5 is an overhead view taken along the segment 5—5 of FIG. 4 showing the arrangement of the shielding device 12' above the heat exchanger 4'. In this view, the heat exchanger 4' is shown in outline below the barriers 14' and 16'. Barrier 16' is a planar section which angles downward from the curved inner surface of the shell 2 on the right hand side of the figure towards the barrier 14' and ends at the chordal lower edge 52. The barrier 14' is a planar section which angles downward to cover the entire cross sectional area of the column from the top edge of vertical section 13' that is below barrier 16' to the top portion of the wall 35 that forms one side of the liquid conduit 30'. The liquid conduit 30' is seen to be formed by the shell 2 and the wall 35 which extends downward in the column from its top edge.

FIGS. 6–9 show a few additional non-limiting examples of the practically limitless variations regarding arrangements of the shielding device that will shield the first heat exchanger from contact with descending liquid and provide a vapor passage for ascending vapor. The position of the heat exchanger is not shown in these drawings but it is assumed to occupy a substantial cross sectional area of the column. In the embodiments shown in FIGS. 6–9 at least one of the group consisting of the vapor inlet, the vapor outlet, and the heat exchanger is not vertically aligned to prevent liquid from contacting the heat exchanger. If an application uses a heat exchanger that occupies a smaller cross sectional area of the column, the shielding devices may be easily arranged to shield it as well, for example in a divided wall column.

FIGS. 6A and 6B respectively illustrate a sectional side view and overhead view of an embodiment of the invention. Elements in FIGS. 6A and 6B that differ in configuration from their corresponding element in FIG. 1 will be designated by attaching an "a" to the reference numeral. The barrier 16a is shown to be a rectangular planar section which covers a rectangular vapor inlet 17a in barrier 14a and has its perimeter angled downwards to deflect intercepted liquid onto barrier 14a. Supports 20a for barrier 16a may be affixed to the vertical portion 13a of the barrier 14a. In this embodiment the barrier 14a comprises a liquid retention trench 44. The liquid outlet 21a is in the section of the shell 2 that also forms a boundary of the liquid retention trench 44. In another embodiment not shown, the liquid retention trench descends from a chordal edge of the barrier 14a.

FIGS. 7A and 7B respectively illustrate a sectional side view and overhead view of an embodiment of the invention. Elements in FIGS. 7A and 7B that differ in configuration from their corresponding element in FIGS. 6A and 6B will be designated by attaching a "b" to the reference numeral. The barrier 14b is shown to have a liquid retention trench 44b around its entire perimeter partially defined by the inner surface of the shell 2. The barrier 14b covers the entire cross sectional area of the column except for the vapor inlets 17b and liquid outlets 21b. The vapor inlets 17b are each covered with a barrier 16b, which is in the form of a tube with a bend to deflect descending liquid onto barrier 14b. An additional bend or projection 25 at the vapor outlet 19b may be used to provide further liquid shielding. Four liquid outlets 21b are shown in the bottom of the liquid retention volume 44b providing fluid communication with liquid conduits 30b. The liquid conduits 30b direct the liquid to other locations within and/or external to the shell as required by the application while preventing the liquid from contacting the heat exchanger not shown. When the liquid conduits are in fluid communication with a vapor space, a liquid seal such as a "J" section or liquid trap is used to prevent vapor from flowing up the liquid conduit 30b.

FIG. 8 illustrates a sectional side view of an embodiment of the invention. Elements in FIG. 8 that differ in configuration from their corresponding element in FIG. 1 will be designated by attaching a "c" to the reference numeral. A single barrier 14c completely covers the cross sectional area of the column to shield the heat exchanger below, not shown, by intercepting descending liquid and directing it to a liquid outlet 21c. A vapor inlet 17c in the shell 2 provides fluid communication with the column below the shielding device and a vapor outlet 19c in the shell 2 provides fluid communication with the column above the shielding device. Thus, the shielding device contains a vapor passage 18c that is external to the shell 2 in this embodiment. The slope of the barrier 14c, if any, and the height of the vapor outlet 19c above the barrier 14c can be adjusted as needed for the specific application. As shown, the lowest level of the liquid outlet 21c is below the lowest level of the vapor outlet 19c providing a path for the liquid to be removed from the shielding device without flowing into the vapor passage 18c. In this embodiment, the portion of the shell 2 between the vapor inlet 17c and the vapor outlet 19c may be seen to provide the second barrier 13c.

Figure 9A:
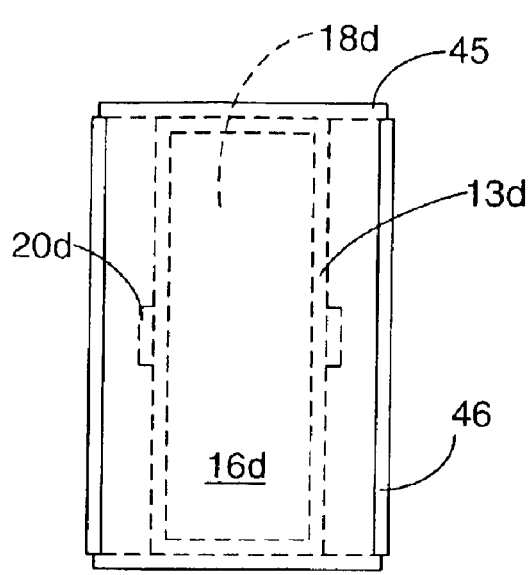
FIG. 9A is an overhead view and FIGS. 9B and 9C are side views of an embodiment of the invention.
Figure 9B:
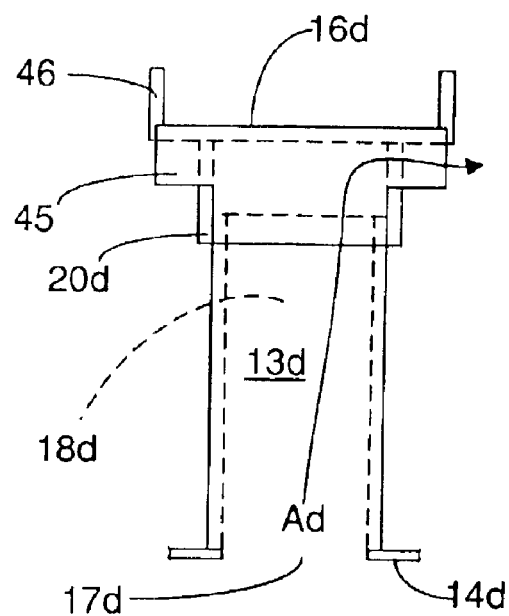
Figure 9C:
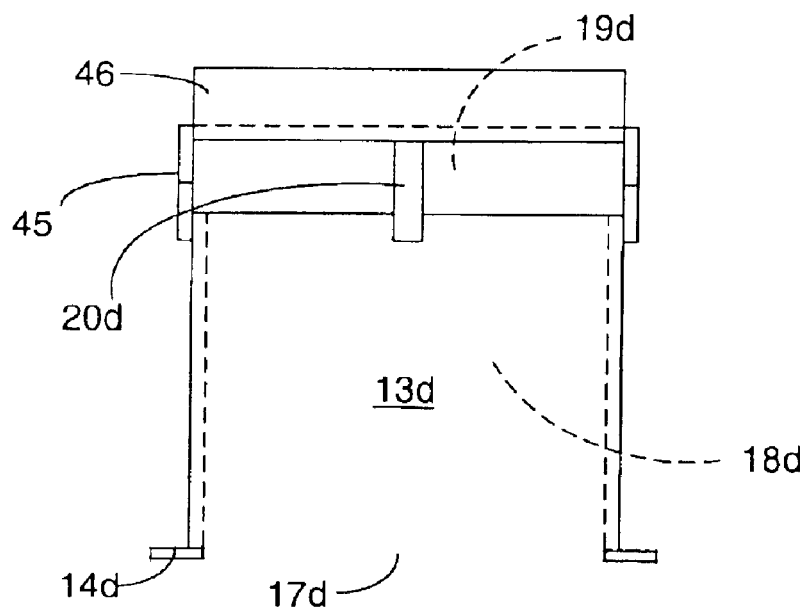

FIGS. 9A, 9B, and 9C illustrate three views of an embodiment of the invention. Elements in FIGS. 9A, 9B, and 9C that differ in configuration from their corresponding element in FIG. 1 will be designated by attaching a "d" to the reference numeral. In these views, the edge of a barrier or portion of a barrier is represented by two lines, one for each side compared to the previous drawings in which the edge of a barrier was represented by a single solid line. FIG. 9A is a downward view perpendicular to the top plane of a barrier 16d which covers a vapor passage 18d. FIGS. 9B and 9C are side views from the shorter and longer sides of vertical wall or portion 13d of the barrier 14d, respectively.

A rectangular vapor inlet 17d comprises an opening in barrier 14d which includes a vertical conduit 13d with a rectangular cross sectional area that partially defines the vapor passage 18d constrained by four sides. Barrier 16d is shown to cover the upper edges of the vertical conduit 13d and be spaced apart from it by two supports 20d which are affixed to the longer sides of the vertical conduit 13d. Barrier 16d is also supported and spaced apart from the vertical conduit 13d by its two shorter end plates 45 which are affixed to the shorter sides of the vertical conduit 13d. The longer sides of barrier 16d each have a wall 46 extending upward from the top planar surface of the barrier 16d to form a channel such that liquid intercepted by the barrier 16d will be directed to the planar portion of barrier 14d and is prevented from entering the vapor passage 18d by the shorter end plates 45. The vapor outlet 19d is shown to be in the two longer sides of the vertical rectangular conduit 13d.

We claim:

1. A method of exchanging heat in a column comprising:
    passing a first vapor phase ascending from a vapor/liquid contacting device in the column through a heat exchanger in the column to exchange heat with a first stream, the heat exchanger producing a second vapor phase in the column;
    passing the second vapor phase through a shielding device; the shielding device being located above the heat exchanger and preventing descending liquid from contacting the heat exchanger; and
    passing the first stream exiting from the heat exchanger through a shell of the column at a location above the vapor/liquid contacting device.

2. The method of claim 1 wherein the first vapor phase ascends through the heat exchanger.

3. The method of claim 1 further comprising passing at least a portion of the descending liquid from the shielding device to another location in the column.

4. The method of claim 1 wherein the heat exchanger produces a condensate out of the first vapor phase.

5. The method of claim 1 wherein the heat exchanger and the shielding device are located between two vapor/liquid contacting devices.

6. A method of exchanging heat in a column comprising:
    passing a first vapor phase ascending from a vapor/liquid contacting device in the column through a first indirect heat exchanger in the column to exchange heat with a first stream, the first indirect heat exchanger producing a second vapor phase in the column:
    passing the second vapor phase through a shielding device; the shielding device being located above the first indirect heat exchanger and preventing descending liquid from contacting the first indirect heat exchanger; and
    passing at least a portion of the second vapor phase above the shielding device through a second heat exchanger inside the column to exchange heat with a second stream.

7. The method of claim 6 wherein the first indirect heat exchanger is located above an uppermost vapor/liquid contacting device.

8. The method of claim 6 wherein the first indirect heat exchanger produces a first condensate out of the first vapor phase.

9. The method of claim 8 further comprising collecting at least a portion of the first condensate and passing it out of the column.

10. The method of claim 6 wherein the second heat exchanger producers a second condensate out of the second vapor phase.

11. The method of claim 10 further comprising passing at least a portion of the second condensate to another location in the column.

12. An apparatus for exchanging heat in a column comprising:

a vapor/liquid contacting device located inside the column and producing a vapor phase;

a heat exchanger located inside the column above the vapor/liquid contacting device, the heat exchanger being in fluid communication with the vapor phase in the column and a first stream;

a conduit providing passage of the first stream exiting from the heat exchanger in the column through a shell of the column at a location above the vapor/liquid contacting device;

a shielding device located above the heat exchanger and having a liquid outlet and a vapor passage, the vapor passage having a vapor inlet in fluid communication with the column below the shielding device and a vapor outlet in fluid communication with the column above the shielding device, the shielding device comprising a barrier; and the apparatus being arranged to shield the heat exchanger from contact with descending liquid.

13. The apparatus of claim 12, wherein the shielding device is arranged so that the lower most portion of the liquid outlet is below the lower most portion of the vapor outlet.

14. The apparatus of claim 12, further comprising a second heat exchanger located inside the column above the shielding device; the second heat excharger being in fluid communication with a second vapor phase In the column and a second stream.

15. A column wherein the apparatus of claim 14 is located above an uppermost vapor/liquid contacting device.

16. The apparatus of claim 12 wherein the shielding device comprises at least two barriers, at least one of the barriers defining the vapor inlet and at least one of the barriers defining the vapor outlet.

17. The apparatus of claim 12, being arranged so that at most two of the group consisting of the vapor inlet, the vapor outlet, and the heat exchanger are vertically aligned.

18. The apparatus of claim 12, wherein the column is a distillation column.

19. The apparatus of claim 12, wherein the heat exchanger is an indirect heat exchanger.

20. The method of claim 6 wherein the first indirect heat exchanger is selected from the group consisting of plate, shell and tube, and tubular heat exchanges.

* * * * *